United States Patent Office 3,374,817
Patented Mar. 26, 1968

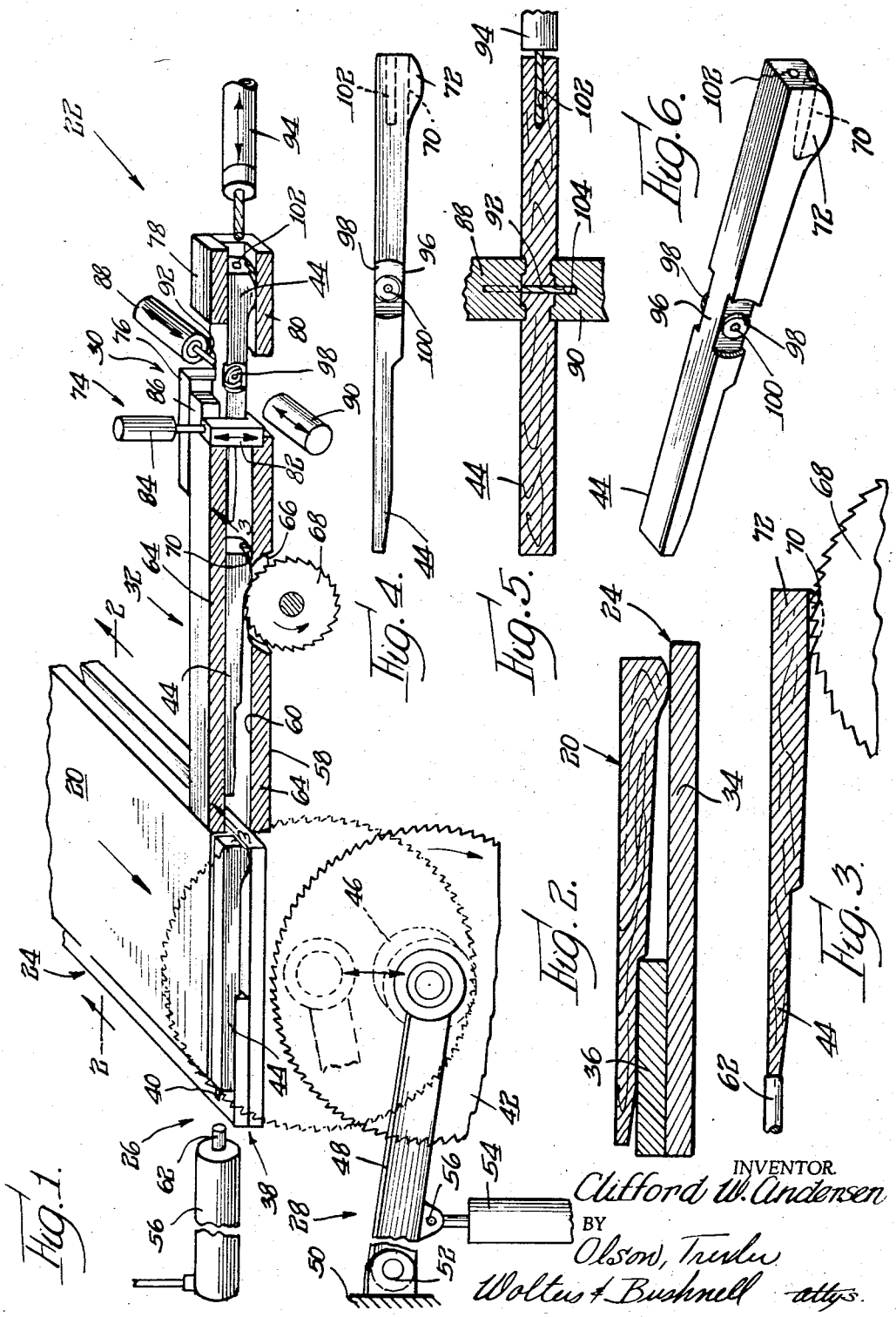

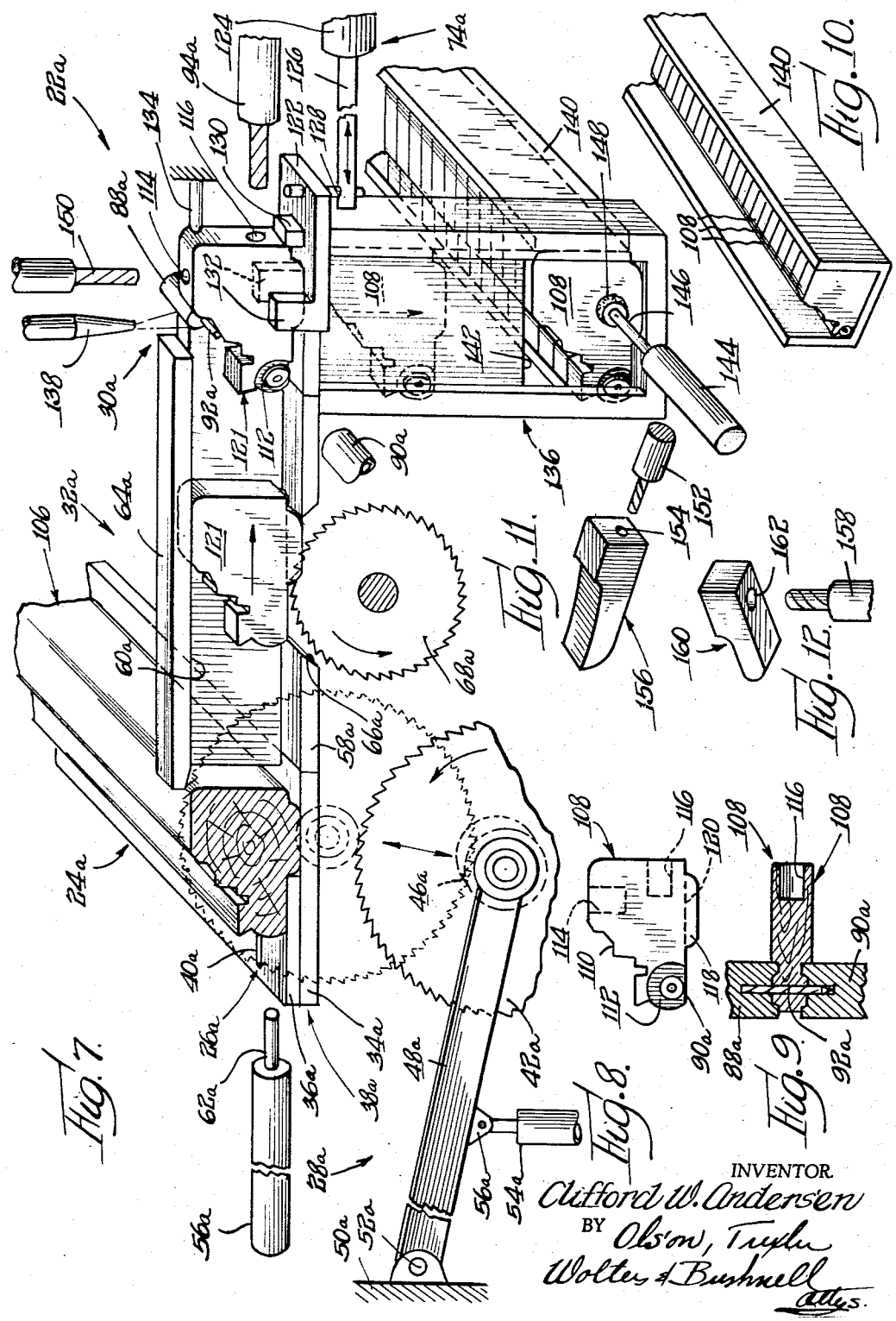

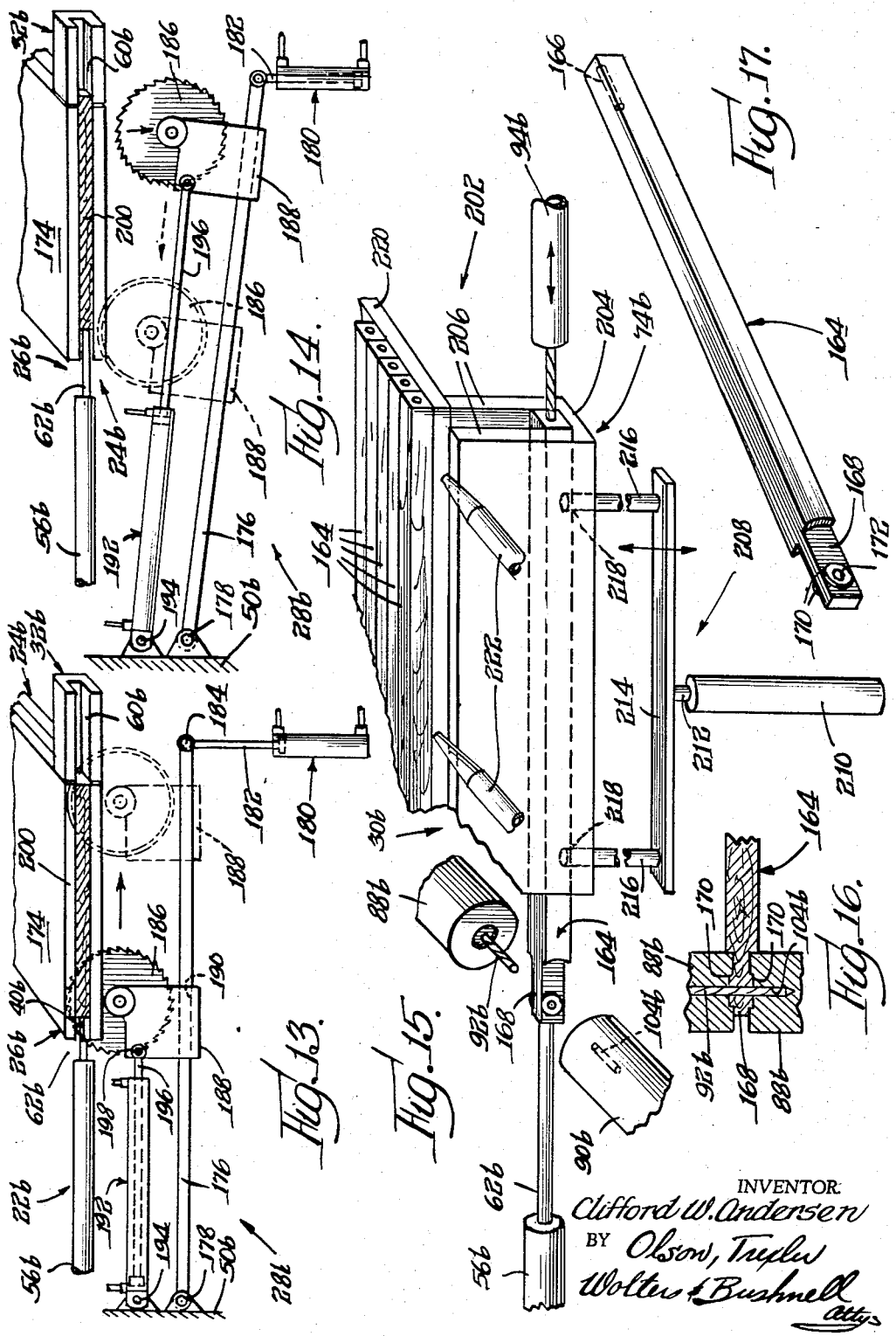

3,374,817
TANDEM STATION MACHINE FOR MAKING PIANO ACTION PARTS
Clifford W. Andersen, De Kalb, Ill., assignor to The Wurlitzer Company, Chicago, Ill., a corporation of Ohio
Filed Sept. 1, 1965, Ser. No. 484,218
2 Claims. (Cl. 144—3)

ABSTRACT OF THE DISCLOSURE

Piano action parts making apparatus having two work stations, a parts blank being cut into individual unfinished parts at one station by a cutter that is arranged to trace a multi-sided path and finished parts being produced at the second station by reciprocably mounted tools.

---

This is a division of my copending application Ser. No. 247,134 that was filed Dec. 26, 1962, now Patent No. 3,241,583.

This invention relates generally to the art of producing pianos and analogous musical instruments and relates more particularly to machines for making parts for the assembly known as a piano action.

Heretofore, it has been common practice to make certain comparatively simple components for a piano action by first cutting individual parts blanks from a board or master blank which had been previously shaped to the general outline of the specific component being manufactured. The resultant semi-processed parts were collected loosely in containers; and subsequent operations were performed on a different machine at which it was necessary to separate the parts individually from the collected mass for orienting them and feeding them into the machine. Parts having generally flat, parallel sides, such as for example hammer butts, stickers and damper levers, were customarily made in this fashion.

I have found that the double handling of the parts and the manual orienting and feeding of the parts at the second machine unnecessarily slow production and unduly burden the parts with labor costs. Therefore, an important object of the present invention is to provide a single machine in which a master blank is cut up at one station whereupon the severed parts are individually and mechanically transferred directly and in an oriented condition to a second station where the basic work operations are performed.

A more general object of the invention is to provide a new and improved machine to be used in making parts for a piano action.

Another object of the invention is to provide a fast-acting machine to be used in making parts for a piano action.

Still another object of the invention is to provide a piano action parts making machine which produces the parts in an economical fashion.

And still another object of the invention is to provide a piano action parts making machine in which an original orientation of the parts is preserved for ease in subsequent handling and assembly.

A further object of the invention is to provide a manufacturing machine for producing comparatively long, slender parts with facility.

A still further object of the invention is to provide a piano action parts making machine which eliminates the need for either large diameter cutters or deep penetration of a rotary cutter into a master blank in severing long, slender parts from the blank.

These and other objects and features of the invention will become more apparent from a reading of the following descriptions.

A machine constructed in compliance with the invention includes means for supporting a parts blank for movement in a path toward a first work station defined at one end thereof, a cutter mounted for movement in a path generally toward and away from the work station for severing a part from the blank, means defining a second work station spaced from the first work station, parts transfer means aligned with the first and second work stations for transporting a severed part from the first to the second work station, and at least one tool mounted to be movable toward and away from the second work station for performing an operation on a severed part situated thereat.

The invention, both to its structure and mode of operation, will be better understood by reference to the following disclosure and drawings forming a part thereof, wherein:

FIG. 1 is a schematic perspective view of a machine constructed in compliance with the principles of the present invention and arranged to produce the piano action part known as a damper lever;

FIG. 2 is an enlarged view taken substantially along the line 2—2 of FIG. 1;

FIG. 3 is an enlarged view taken substantially along the line 3—3 of FIG. 1;

FIG. 4 is an enlarged side elevational view of a finished damper lever showing the recesses and bores which are formed in the part at the machine of FIG. 1;

FIG. 5 is a top plan view of the damper lever of FIG. 4 illustrating the drilling of one end and the drilling and routing of a medial portion thereof;

FIG. 6 is a somewhat enlarged, perspective view of the completed damper lever;

FIG. 7 is a schematic perspective view of a modified embodiment of the machine of the invention, particularly arranged to produce the part known as a hammer butt;

FIG. 8 is a side elevational view of a finished hammer butt, illustrating the recesses and bores which are formed in the part at the machine of FIG. 7;

FIG. 9 is a top plan view of the hammer butt of FIG. 8 showing the routing of an end portion of the part to form a tongue to be used in mounting the part to a butt flange;

FIG. 10 is a perspective view in reduced scale showing a group of finished hammer butts collected in a tray provided for such purpose;

FIG. 11 is a perspective view of the piano action part known as a backcheck and illustrating manufacture of the part by drilling a hole in one end thereof;

FIG. 12 is a perspective view of the piano action part known as a catcher and illustrating manufacture of the part by drilling a hole in the bottom thereof;

FIG. 13 is a schematic perspective view of the cutoff station of a further modified embodiment of the invention particularly adapted to produce the piano action part known as a sticker;

FIG. 14 is a view similar to the showing of FIG. 13 but illustrating the parts in a different operating relationship, particularly that arrangement realized upon completing the cutting of a part from the master blank;

FIG. 15 is an enlarged, schematic perspective view of the second or work station of the machine of FIG. 13;

FIG. 16 is a top plan view taken in cross-section showing the drilling and routing of one end of the sticker to form a tongue for use in mounting the part to a whip; and FIG. 17 is an enlarged, perspective view of a finished sticker.

Piano action parts are traditionally fabricated from the wood of the hard or sugar maple tree; and in order to make a board or blank from which the parts may be cut, a suitable number of strips of hard maple wood are secured together at their lateral edges by means of adhesive. The resultant board incorporates the grain of the wood running along its width in order that strong, highly serviceable parts may be cut therefrom much in the manner of cutting slices from a loaf of bread. After this board is made, it is shaped to the desired cross-section of the finished part.

Referring now in detail to the drawings, specifically to FIG. 1, a master blank indicated by the numeral 20 is seen to have been formed from such a board and shaped to take a cross-section corresponding to the longitudinal cross-section of the piano action part known as a damper lever. The machine which is to be used in making damper levers from the blank 20 is indicated generally by the numeral 22, and the machine 22 includes a table 24 for supporting the parts blank 20 for movement in a path toward a first work station 26 defined by the support table 24 at one end thereof. In addition to the support table 24, the machine 22 includes a cutter arrangement 28, means defining a second work station 30 spaced from the first work station 26, a parts transfer arrangement 32, and a number of tool members mounted to be movable toward and away from the second work station 30.

Considering FIG. 2, the parts blank 20 is seen to be provided with a stepped lower surface in compliance with the customary shape of a damper lever; and if it is desired to maintain the upper surface of the blank 20 level, the support table 24 is arranged to include a principal platform 34 and an auxiliary platform 36 superposed thereon at one lateral portion thereof. The parts blank 20 is fed over the table 24 towards the work station 26 either manually or automatically; and returning to FIG. 1, the table 24 is seen to be provided with an end portion 38 that is spaced from the remainder of the table at the work station 26 in order that a cutter may be moved into incising engagement with the blank 20. The end portion 38 may be completely separated from the remainder of the table 24, or the necessary separation may be provided by an elongated slot 40 opening through the table transversely to the path of movement of the parts blank 20.

The cutter arrangement 28 includes a rotary cutter blade 42 that is aligned transversely of the path of movement of the parts blank 20 to be transported in a cutting path generally toward and away from the work station 26 for use in severing parts 44 from the blank. Specifically, the rotary cutter blade 42 is mounted on the output shaft of a suitably energized motor 46, motor 46 being fastened to an arm 48 which is swingably connected to a wall or other rigid structure 50 by means of a pivot 52. A fluid-actuated cylinder or jack 54 is coupled to the arm 48 intermediate the ends thereof by a mounting 56; and while the motor 46 is employed in rotating the cutter blade 42, the cylinder 54 is utilized in oscillating the cutter blade into and out of incising engagement with the blank 20. The cylinder 54 may be replaced with a slide-crank arrangement or other selectively extensible and retractable means as is desired. Movements of the cutter blade 42 are suitably coordinated with movements of the parts blank 20, for example by means of positionally responsive control elements such as limit switches.

The parts transfer arrangement 32 is aligned with the work station 26 and with the work station 30 for transporting severed parts 44 from the work station 26 to the work station 30; and advantageously, the parts transfer arrangement 32 includes a fluid-actuated cylinder or jack 56 disposed on one lateral side of the table 24, arrangement 32 further including a transfer member 58 situated on the opposite lateral side of the table 24 and fashioned with a channel or passageway 60. The cylinder 56 includes an extensible and retractable piston 62 which is aligned with the channel 60, both the piston 62 and the channel 60 being aligned with the end portion 38 of table 24 so as to pass the severed parts one at a time from the work station 26 to the work station 30. The transfer member 58 includes walls 64 which supportably engage the severed part during its transit for maintaining the part in a given spatial orientation. This spatial orientation of the severed part ordinarily coincides with the spatial orientation established by the positioning of the parts blank 20 on table 24 and the arrangement of work station 26.

The cylinder 56 is arranged to take a sufficient length and the piston 62 is arranged to be sufficiently extensible therefrom to transfer each severed part 44 from the work station 26 to the work station 30 by directed movement throughout the entire length of its transportation. So arranged, the lower wall 64 of the transfer member 58 may be advantageously fashioned with a vertical slot 66, slot 66 being used to admit the cutting edge of a rotary cutter 68 which is fixed in position beneath the member 58 and in alignment with the slot 66. Cutter 68 is thus partly situated in the parts path defined by the transfer arrangement 32 for forming a portion of each part transported thereover. In addition, cutter 68 may be replaced by a milling cutter or other similar, material-removing element.

More specifically, the piston 62 is employed to transport severed parts 44 into cutting relationship with the rotary cutter 68 for forming a groove 70 in a heel portion 72 of the parts blank 44. Cutting of the groove 70 is best shown in FIG. 3. (When the finished damper lever is assembled in a piano action, the groove 70 receives one end of a damper lever return spring. This end of the spring is usually cushioned with a felt pad adhesively secured to the floor of the groove.) Operation of the cylinder 56 is coordinated with operation of the cutter arrangement 28 in any conventional manner, as by the use of limit switches or other position sensitive control elements.

When the piston 62 has delivered a severed part 44 to the work station 30, the part is grippingly received by a clamp arrangement 74 that is incorporated in the work station assembly. The work station assembly also includes a lateral guide plate 76, a top guide plate 78 and a bottom guide plate 80; and these guide plates or walls cooperate with the clamp arrangement 74 in positioning the severed part 44 for the various forming operations. While the guide plates 76, 78 and 80 are fixed in place, the clamp arrangement 74 comprises a grip element 82 that is made vertically reciprocable by attachment to the piston of a fluid-actuated cylinder or jack 84. The grip element 82 is lowered to permit passage of a part 44 into the position shown in FIG. 1 whereupon the cylinder 84 acts to lift the grip element 82 for grasping the part 44 and holding it against the guide plate 76 and against a portion 86 of the upper guide plate 78, portion 86 being situated adjacent the guide plate 76 as shown. The clamp arrangement 74 need not comprise the elements just described but may comprise other suitable combinations such as for example, a spring-loaded grip element.

When a severed part has been properly positioned at the work station 30, one or more tool members are actuated to perform shaping operations on the part. With continued reference to FIG. 1 and with secondary reference to FIG. 5, the tool members are seen to comprise opposed router members 88 and 90, a drill bit 92 and a drill member 94. The router members 88 and 90 are intended to cut recesses into opposite lateral sides of a part 44 at approximately the mid-section thereof to form a tongue 96 with bosses on either side thereof as is shown in FIGS. 4 and 6. Since the longitudinal axis of the part 44 is aligned with the longitudinal axis of work station 30, the router members are advantageously disposed laterally and medially of the longitudinal axis of the work station as is well shown in FIG. 1. The tongue 96 and its lateral bosses 98 are provided for use in mounting the damper lever to a bifurcated damper flange as is well known in the piano making art; and because a pivot pin is employed in this mounting, the bosses 98 and the tongue 96 are pierced with a hole 100. This hole is formed by the drill bit 92; and therefore the bit 92 is fixed coaxially with one of the router members 88 and 90.

The damper lever produced from the part 44 is required to have a longitudinal hole 102 opening from the end which is provided with the heel 72 as is shown in FIGS. 4 and 6. The hole 102 is intended to receive the knurled end of a damper rod or wire to the other end of which is attached the damper head. The drill member 94 is adapted to form the hole 102; and therefore, the drill member is aligned generally parallel with the longitudinal axis of the work station 30 as is indicated in FIG. 1.

The router member 90, the drill member 94 and the router member 88 to which the drill bit 92 is shown to be attached are mounted to be movable toward and away from the work station 30 for performing the described operations on a severed part 44 situated thereat; and while various means for providing the desired movement of the tool members may be utilized, it has proved convenient to mount each of the tool members on the output shaft of an electric motor. This motor is then mounted on a slide to be oscillated toward and away from the work station.

When the router members 88 and 90 are arranged to converge in unison upon the part or workpiece, it is necessary to fashion the router member 90 with a bore 104, shown in FIG. 5, for receiving the drill bit 92. However, such an arrangement has a problem of aligning the drill bit and the bore. Hence, separate operation of the router members 88 and 90 is preferred. In addition, it is desirable to operate the drill member 94 into the workpiece before the router members are actuated. When such a procedure is followed, the drill member 94 may be conveniently actuated while the opposite end of the part is still retained by the plunger 62 whereby to support the part against the action of the advancing drill. Moreover, the drill member 94 is desirably provided with a relatively long traverse in order that the finished part may be ejected from the work station 30 at the end thereof which is remote from the transfer arrangement 32. Thus, the finished part may be ejected by a subsequent part being impelled into the work station by the piston 62.

The operation of machine 22 is apparent from the foregoing descriptions. From these descriptions, it is also apparent that the machine 22 is arranged so that a master parts blank is cut up at one station whereupon the severed parts are individually transferred directly and in an oriented condition to a second work station where the basic forming operations are performed. It is also evident that the machine 22 is fast-acting, particularly by virtue of the fact that forming operations, such as for example, the shaping of the bosses 98 by the router members 88 and 90, may be performed at the same time that the cutter arrangement 28 is severing a part from the master parts blank 20.

While a particular embodiment of the invention has been thus far shown and described, it should be understood, of course, that the invention is not limited thereto since many modifications may be made. Therefore, certain modified embodiments of the invention are illustrated in FIGS. 7–17. Since certain similarities exist among the several embodiments, like numerals have been used to designate like parts, the suffix letter *a* being employed to distinguish those elements associated with the embodiment of FIGS. 7–10 and the suffix letter *b* being utilized to delineate those elements associated with the embodiment of FIGS. 13–17.

The embodiment of FIGS. 7–10 is particularly adapted to produce the piano action part known as a hammer butt, and it will be recognized from an inspection of FIG. 7 that a master parts blank 106 which is supported on the table 24a has been contoured to present a profile corresponding generally to that of a finished hammer butt. With reference for the moment to FIG. 8, a finished hammer butt 108 is seen to be provided with a surface 110 which is appropriately contoured to receive the butt-covering material and the associated resilient pads. In addition, the butt 108 includes a tongue 112 that is used in pivotally mounting the butt to a bifurcated butt flange. Perpendicularly arranged bores 114 and 116 are provided to receive the catcher shank and the hammer shank respectively; and finally, a heel portion 118 is fashioned with a groove 120 in which a felt pad is secured to receive one end of a hammer return spring.

Referring in greater detail to FIG. 7, the machine 22a is seen to possess a number of distinguishing characteristics. For example, the channel 60a of the parts transfer arrangement 32a is dimensioned to accommodate the height of a semi-processed part 121 which has been severed from the blank 106 by the cutter arrangement 28a. Furthermore, the clamp arrangement 74a is rearranged and repositioned relative to the clamp arrangement 74 disclosed in FIG. 1. Specifically, the clamp arrangement 74a includes a platform 122 that is a reciprocated in a horizontal path by means of a fluid-actuated cylinder or jack 124. The cylinder 124 has an extensible and retractable piston 126 which is connected to the platform 122 by a post 128. Disposed on the platform 122 are an end-blocking formation 130 and a pair of side-blocking formations 132. The formations 130 and 132 cooperate with the platform 122 both in receiving a semi-processed part 121 from the transfer arrangement 32a and in preserving the spatial orientation of the part which has been established by the table 24a, the work station 26a and the transfer arrangement 32a.

When the finishing operations have been completed at the work station 30a, the cylinder 124 is actuated to retract the piston 126 and withdraw the platform 122 from its position adjacent the end of channel 60a. A horizontal finger 134 is disposed in fixed position to contact an end surface of the part 121 so as to strip the part from the platform 122 upon withdrawal thereof. Upon removal of the platform 122, the part descends under the influence of gravity from the work station 30a into a guide track 136 which is disposed therebeneath; and advantageously, air assist is provided from a nozzle 138, guide track 136 combining with nozzle 138 to constitute a parts ejecting arrangement. A parts collecting tray 140 is aligned with the lower end of guide track 136, and an aperture 142 is fashioned in one sidewall of the guide track for permitting a fluid-actuated cylinder or jack 144 to drive the individual finished parts 108 into the tray 140. The cylinder 144 includes an extensible and retractable piston 146, and a resilient head 148 fashioned of rubber or other suitable material may be secured to the free end of piston 146 for engagement with the parts being delivered to the tray 140. The finished hammer butts 108 are preserved in their oriented relationship in the tray 140 in order that the butt-covering material may be applied to the parts in a group in compliance with conventional manufacturing procedures; and it is to be noted that the finished hammer butts are arranged in the tray 140 in the same general configuration that is displayed by the master blank 106 from which the parts are cut.

In compliance with the specific part being manufactured by the machine 22a, i.e., hammer butts, the drill bit employed in the drill member 94a is selected to possess a comparatively large diameter in order to bore the hole 116 in an appropriate size. Similarly, a vertically reciprocable drill member 150 is incorporated with the other tools at the work station 30a in order to form the hole 114. In further compliance with the requirements of the part being produced, the router members 88a and 90a are situated so as to contact the parts blank adjacent one end thereof for appropriately shaping the tongue 112. The router members 88a and 90a are therefore situated adjacent one end of the work station 30a rather than at a medial position.

When it is desired to determine the accuracy in the work performed at station 26a, a gauging station may be situated in the parts transfer arrangement 32a in order to measure the thickness of the severed parts before subsequent work operations are performed thereon.

The parts manufacturing machine of the invention may also be arranged to produce the piano action parts known as the backcheck and the catcher. When a backcheck is to be produced, the tool members at the second work station are reduced to a single drill member shown at 152 in FIG. 11. The drill member 152 is positioned similarly to the drill members 94 and 94a to bore a hole 154 in one end of a backcheck 156. The hole 154 is adapted to receive a rod or wire by which the backcheck is mounted on the whip in upstanding relationship.

When the machine of the invention is adapted to manufacture the part known as a catcher, the tool members at the second work station are rearranged to include only a single drill member indicated at 158 in FIG. 12. After a catcher part 160 is situated at the second work station, the drill member 158 is urged toward the part to drill a hole 162 in the main body of the part. Hole 162 is adapted to receive the catcher shank by which the part is mounted to the hammer butt. This catcher shank is specifically mounted to the hammer butt at hole 114 as has been described hereinabove.

In FIGS. 13–17, the machine of the invention is shown embodied for the manufacture of that piano action part known as a sticker or abstract, the cutoff or first work station being shown in FIGS. 13 and 14 and the second work station where the forming operations are performed being shown in FIGS. 15 and 16. In FIG. 17, a finished sticker is shown at 164; and it will be seen to take the shape and form of a long, slender part. A pilot bore 166 is drilled axially at one end of the sticker to receive a screw that is used in connecting the sticker to the piano key lever which is used in actuating the piano action. At its opposite end, the sticker 164 is formed with a tongue 168; and the tongue 168 has lateral bosses 170 which are centrally perforated with a bore 172. The tongue 168 is employed in mounting the sticker to a bifurcated end of the whip of a piano action.

With reference to FIGS. 13 and 14, the stickers 164 are seen to be fabricated from a master parts blank 174 which, it will be noted, possesses a rectangular cross-section of appreciable width; and the machine of FIGS. 13–16 is particularly distingushed by the novel combination found in the cutter arrangement 28b. In particular, the cutter arrangement 28b eliminates the need for either large diameter cutters or deep penetration of a rotary cutter into a blank from which the long, slender parts are cut.

The cutter arrangement 28b specifically comprises an arm 176 that is swingably mounted to the wall 50b by a pivot 178. A fluid-actuated cylinder or jack 180 is provided for swinging the arm 176, the cylinder 180 including an extensible and retractable piston 182 that is connected to the arm 176 by a pivot 184 for this purpose. The cutting element comprises a rotary cutter blade 186 which is provided with suitable motive power as by being mounted on the output shaft of an electric motor, not shown. More importantly, the rotary cutter blade 186 is mounted to a carriage 188 that is slidably coupled to the arm 176 as by being provided with a channel 190 that slidably receives the arm 176.

The carriage 188 is adapted for movement between two extreme positions on arm 176, these extreme positions being shown in solid outline and in broken outline respectively in FIG. 13. A fluid-actuated cylinder or jack 192 is provided for incurring the movements of the carriage 188 between these extreme positions; and cylinder 192 is swingably mounted to the wall 50b by a pivot 194. The cylinder 192 also includes an extensible and retractable piston 196 that is connected to the carriage 188 at a pivot 198.

The cylinders 180 and 192 direct the rotary cutter blade 186 through a pattern of movement that is especially advantageous for severing individual parts from the blank 174. Assuming that the arm 176 has been directed into approximately level position in compliance with the showing of FIG. 13, the cutter 186 will be correspondingly positioned to reside partly within the slot 40b and into obstructing relationship with one lateral side of the blank 174 for incising engagement therewith. With a cut thus started in the blank 174, the cylinder 192 will be actuated to extend the piston 196 and thereby transport the carriage 188 from the position shown in solid outline to the position shown in broken outline. By this movement of the carriage 188, the rotary cutter blade 186 will have been directed along a horizontal portion of its path of movement and through the blank 174 whereby to incise a part 200 therefrom.

At the end of this horizontal travel, the cylinder 180 is actuated to retract the piston 182 for swinging the arm 176 in a downward direction into the position shown in solid outline in FIG. 14. This action withdraws the rotary cutter blade 186 from the parts blank 174; and once withdrawn, the carriage 188 is returned to its starting position by actuating the cylinder 192 to retract the piston 196. The inward or retracted condition of the carriage 188 is shown in broken outline in FIG. 14. There, it will be noted, the cutter blade 186 resides beneath the parts blank 174 adjacent the side thereof which is remote from the transfer arrangement 32b.

While the carriage is thus being retracted, the cylinder 56b may be actuated to extend the piston 62b into transporting relationship with the severed part 200 for urging the part into the channel 60b of the transfer arrangement 32b. Finally, the cylinder 180 is actuated to extend the piston 182 and return both the carriage and the rotary cutter blade from the position shown in broken outline in FIG. 14 to the position shown in solid outline in FIG. 13, thus completing a full cycle of operation.

It is recognized that the starting position of the rotary cutter blade may be so situated as to clear the remote side of the parts blank 174 as well as to be situated in incising engagement therewith as has been described. It is evident that the cutter arrangement 28b severs the comparatively long, slender parts from the parts blank with considerable facility. Moreover, the cutter blade 186 need penetrate the blank only slightly more than the thickness thereof in order to achieve severance of the individual parts; and in addition, it will be noted that the cutter blade 186 possesses a relatively small diameter in comparison with the width of the blank 174. As a consequence, economical tools and components may be employed.

Turning to FIG. 15, the work station 30b is seen to be distinguished by embodying a novel parts ejecting arrangement indicated generally by the numeral 202. In order to accommodate the ejecting arrangement 202, the clamp arrangement 74b is fabricated in the form of an upwardly opening, U-shaped channel or support track 204, the opposite sides of which merge into vertical guide tracks 206. A lifter arrangement 208 underlies the channel 204 and includes a cylinder or jack 210 having an extensible and retractable piston 212. A bar 214 is attached to the otherwise free end of the piston 212, and rods 216 are mounted on the bar 214 in upstanding relationship. The floor of channel 204 is perforated with apertures 218 which pass the rods 216 slidably into engagement with a part held in the confines of the channel.

With the clamp arrangement 74b and the parts ejecting arrangement 202 thus associated with the lifter arrangement 208, a finished part 164 may be readily raised to a parts collecting platform 220 after the tool members 88b, 90b, and 94b have performed their work operations. In performing these work operations, the drill member 94b will be transported into boring relationship with the end of the semi-processed part while the piston 62b is still in supporting relationship with the opposite end thereof. Thereafter, the router members 88b and 90b will be directed to perform their operations on the opposite end of the semi-processed part to form the tongue 168. It is to be noted that the router members 88b and 90b are situated adjacent one end of the work station 30b for appropriate formation of the tongue 168.

After the router members 88b and 90b have been retracted upon completing their functions, the cylinder 210 is actuated to extend the piston 212 therefrom, thereby urging the rods 216 through the apertures 218 and into lifting engagement with the underside of the finished sticker 164. The rods 216 serve to raise the finished sticker through the vertical guide tracks 206 to a position clearing the top surface of platform 220; and in this position, the finished sticker can be delivered from the control of the rods 216 and onto the platform 220 by means of an air blast from one or more nozzles 222. It is important to realize that the rods 216 may be replaced by vertically movable transfer blades, the top one of which may be arranged to overtravel for permitting air ejection of the finished part onto the platform 220. It is also important to realize that the parts transfer arrangement 32b is aligned with the channel 204 so that the piston 62b may deliver the severed parts 200 from work station 26b to work station 30b in a spatially oriented relationship. In addition, the lifter arrangement 208 cooperates with the vertical guide tracks 206 to preserve this orientation of the parts after they have been finished and for their delivery to the platform 220.

The specific examples herein shown and described are to be considered as being primarily illustrative. Various changes in structure will, no doubt, occur to those skilled in the art; and such changes are to be understood as forming a part of this invention insofar as they fall within the spirit and scope of the appended claims.

The invention is claimed as follows:

1. In a machine to be used in making parts for a piano action, the combination comprising: means supporting a parts blank for movement in a path toward a first work station defined by said means at one end thereof; cutter means mounted for movement in a path generally toward and away from said work station for severing a part from said blank, including a pivotal arm, a cutter assembly mounted for slidable movement along said arm, first extensible and retractable means connected to said arm for swinging the same in an arc, and second extensible and retractable means connected to said cutter assembly for sliding the same forth and back along said arm whereby said cutter assembly is transported to trace a multi-sided path one portion of which intersects the path of said parts blank along the width thereof and the remaining portions of which fall outside the projected path of said blank; means defining a second work station spaced from said first work station; parts transfer means aligned with said first and second work stations for transporting a severed part from said first to said second work station; and at least one tool means mounted to be movable toward and away from said second work station for performing an operation on a severed part situated thereat.

2. In a machine to be used in making stickers for a piano action, the combination comprising: means supporting a parts blank for movement in a path toward a first work station defined by said means at one end thereof; cutter means mounted for movement in a path generally toward and away from said work station for severing a sticker part from said blank; means defining a second work station spaced from said first work station; parts transfer means aligned with said first and second work station for transporting a severed part from said first to said second work station; and tool means mounted to be movable toward and away from said second work station, including opposed router members disposed laterally of the longitudinal axis of said second work station adjacent one end thereof, a drill bit coaxial with one of said router members, and a drill member aligned parallel with the longitudinal axis of said second work station adjacent the other end thereof.

References Cited
UNITED STATES PATENTS 2,243,919    6/1941    Paxton et al.
3,235,949    2/1966    Andersen et al. \_\_\_\_ 144—3 XR

FOREIGN PATENTS 3,241,584    3/1966    France.

WILLIAM W. DYER, JR., *Primary Examiner.*

W. D. BRAY, *Assistant Examiner.*